June 4, 1929.  W. H. MUSSEY  1,716,146
CAR TRUCK
Filed Dec. 5, 1927  2 Sheets-Sheet 1

Inventor
William H. Mussey
By Oscar Hochberg
his Attorney

June 4, 1929.  W. H. MUSSEY  1,716,146
CAR TRUCK
Filed Dec. 5, 1927    2 Sheets-Sheet 2
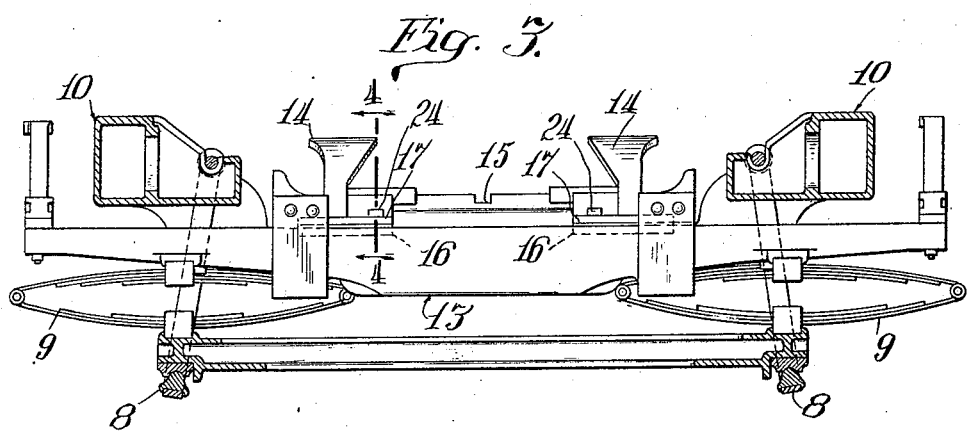
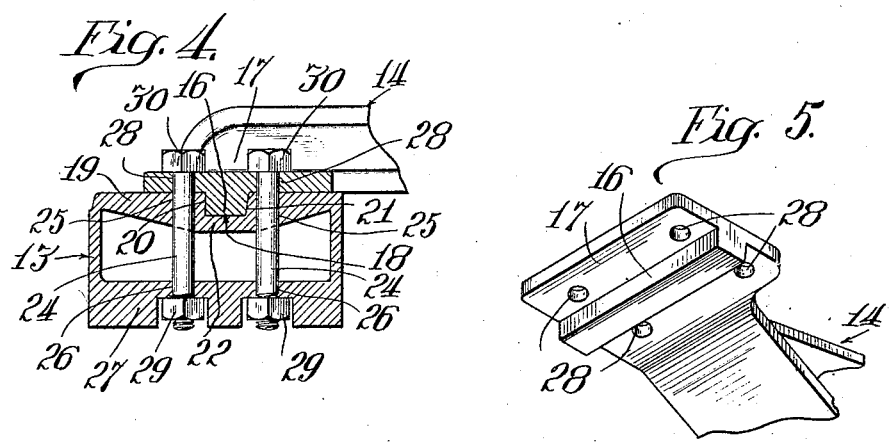
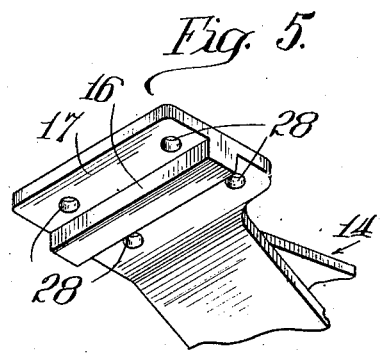
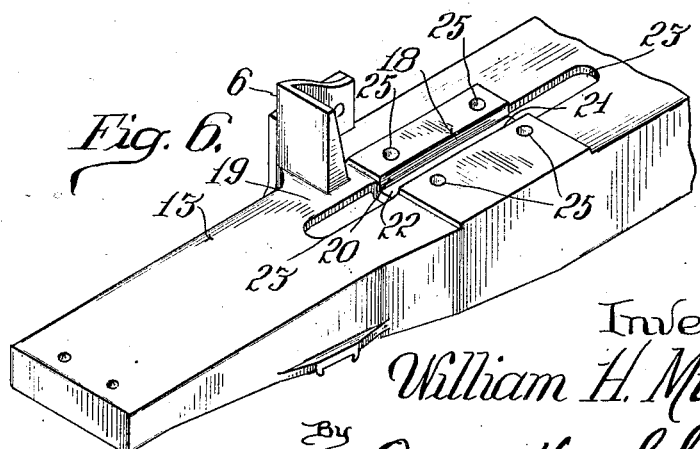
Inventor
William H. Mussey
By Oscar Hochberg
his Attorney Patented June 4, 1929.

1,716,146

UNITED STATES PATENT OFFICE.

WILLIAM H. MUSSEY, OF CHICAGO, ILLINOIS, ASSIGNOR TO PULLMAN CAR AND MANUFACTURING CORPORATION, OF CHICAGO, ILLINOIS, A CORPORATION OF ILLINOIS.

CAR TRUCK.

Application filed December 5, 1927. Serial No. 237,841.

My invention relates to car trucks employing a plurality of spaced bolsters extending transversely of the truck and connected by a center-plate supporting spider or center bolster extending longitudinally of the truck.

Heretofore, the center spider, when formed separately from the transverse bolsters, was usually rigidly connected to these members by rivets or bolts, but as a consequence of the operations of train service, or because of inequalities in the parts themselves, or inaccuracies in the location of rivet or bolt holes, the desired relation of associated parts was effected or maintained with difficulty. Such defects developed serious derangement of the truck structure and resulted ultimately in the failure of the parts to function properly.

To overcome the above noted and other deficiencies in trucks of similar design it is the purpose of this invention to provide means for assembling the center spider and associated bolsters accurately and expeditiously by the use of interengaging lugs and sockets formed with said spider and bolsters and designed and disposed to insure the proper relation between the members thus connected and contiguous truck frame members.

An important object of the invention is to provide means for relieving the removable fastening means of the stresses to which they would otherwise be subjected.

A further object is to provide interengaging means separate from but supplementing the fastening means for preventing relative lateral movement between center bolster and associated transverse members of the truck.

The foregoing and other objects are attained by the mechanism illustrated in the accompanying drawings, in which—

Fig. 3 is a transverse vertical sectional view taken on line 3—3, Fig. 1, looking in the direction indicated by the arrows, further showing the connection between the center bolster and one of the transverse elements of the truck;

Fig. 4 is a fragmentary view in vertical section taken on line 4—4, Fig. 3, showing on an enlarged scale the character of the joint formed between an end of the center bolster and one of the transverse members of the truck;

Fig. 5 is a perspective underside view of one of the bifurcations of the center bolster formed with the interlocking lug of my invention; and Fig. 6 is a perspective view of the upper side of one of the transverse elements recessed to receive the adjacent lug on center bolster.

Figure 1:
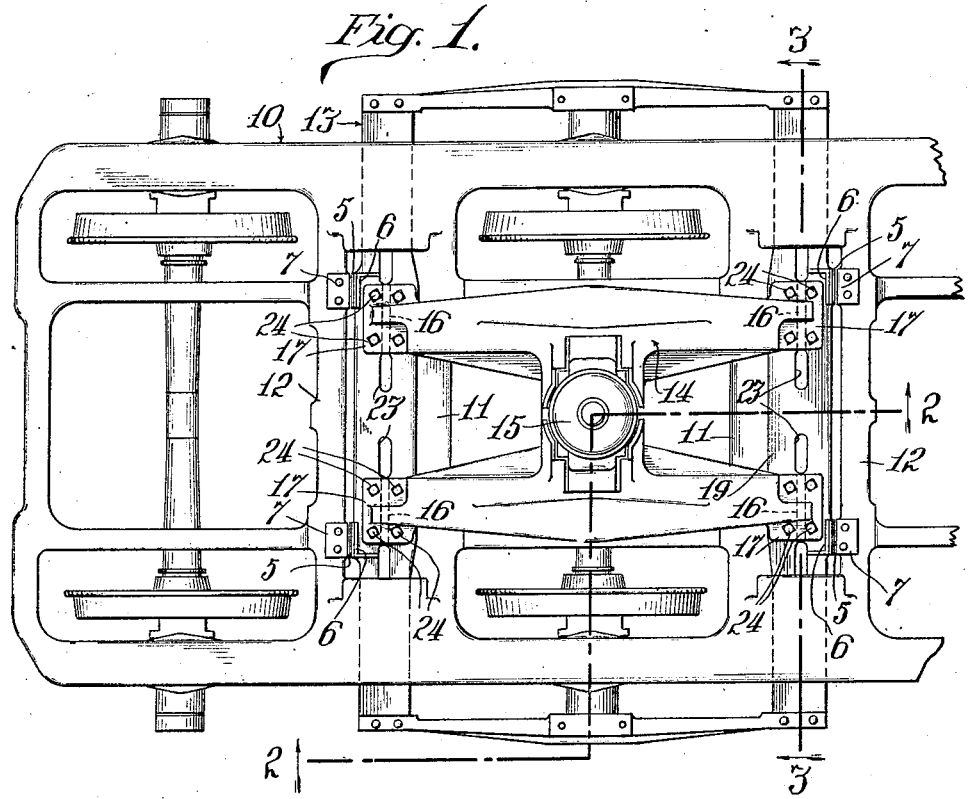
Fig. 1 is a plan view of a truck equipped with the invention.
Figure 2:
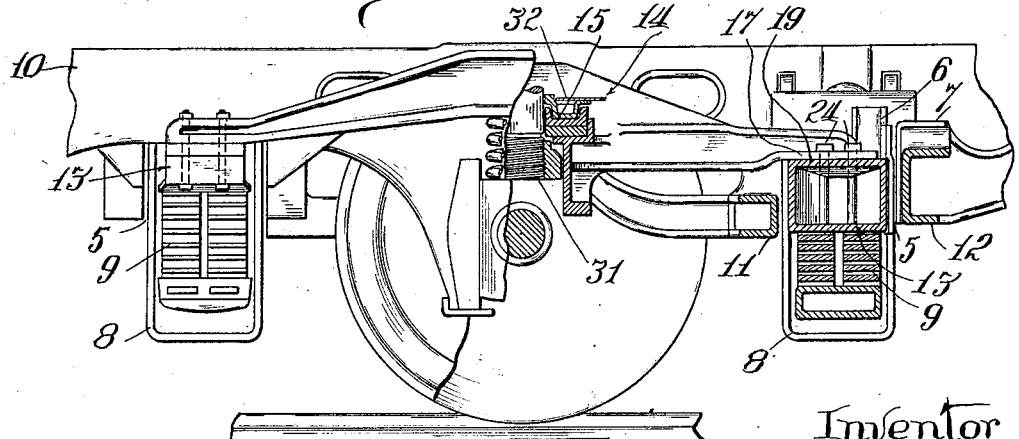
Fig. 2 is a side elevational and sectional view taken on line 2—2, Fig. 1, looking in the direction indicated by the arrows, showing the interlocking connection between the center bolster and associated transverse members.

In the drawings, 10 represents the side frame of the truck, 11 the inner, and 12 the outer connecting transverse transoms between which are mounted the transverse bolsters 13, connected by the center bolster or spider 14 supporting the center plate 15. The spider 14 transmits the body thrust from the center plate 15 to both transverse bolsters 13 simultaneously through the medium of lugs 16, preferably elongated and formed integral with arms 17 of the spider casting. The lugs 16 are nested in corresponding sockets 18 in the top webs 19 of the bolsters 13, the lugs and the respective sockets being tapered along one of their sides to insure positive engagement between contiguous faces of the respective lugs and sockets.

The effect of the body thrust upon the truck is to cause a slight movement of the bolsters 13 toward and away from the respectively adjacent outer connecting transoms 12. This movement results from the yielding action of the bolster supporting springs 9 permitting the bolsters to move laterally within the range of normal clearances 5 provided between the bolster and transom members, and continues until the tractive effort of the locomotive is transmitted to the truck wheels by the resultant engagement of the bolsters and transoms. To prevent abnormal movement of the bolsters and possible interference between bolsters and side arms of swing hangers 8, the impact faces of transoms 12 and the bolsters 13 are protected by friction plates 7 and 6, respectively, which are renewed when worn and the clearances between them have become excessive. The clearances are preserved by the interlocking of spider 14 and bolsters 13 and the maintenance at all times of the fixed rectangular relation between members of the bolster assembly is assured by the nesting of spider lugs 16 with bolster sockets 18 above noted, whereby the bolsters 13 are held spaced apart a predetermined distance by the bolster spider 14 when assembled, and independently of the removable bolts 24 as will hereinafter appear.

Elongated sockets 18 are formed as indicated in Figs. 4 and 6, with opposite side walls 20 and 21 and bottom connecting wall 22 defining sockets having open ends communicating with respectively adjacent core openings 23 at opposite ends of the sockets as shown in Figs. 1 and 6. Sockets thus formed and positioned between core openings 23 in the bolster webs 19, lend themselves to the use of planers or millers capable of taking a continuous cut from end to end of the socket between the core holes 23, insuring uniformly flat thrust areas for the bolster lugs 16.

The extended bearing surfaces afforded by the elongated lugs 16 and sockets 18 are supplemented by a plurality of removable retaining bolts 24 arranged upon opposite sides of the respective lugs and sockets and having a bearing in registered openings 25 and 26 in the top and bottom webs 19 and 27, respectively, of the bolsters 13, and in similar openings 28 in the center bolster arm 17, as best shown in Figs. 1 and 4 of the drawings. The bolts are fitted with threaded holding nuts 29 seated against the underside of bolster bottom web 27, the bolt heads 30 finding a bearing upon the upper sides of the center arms 17 of the center bolster spider 14. With the greater length of the bolts disposed below the bearings in openings 25 in the top webs 19 of the bolsters 13, the relatively short portions of the bolts engaging the bearings 28 in center bolster arms 17 present rigid securing means for the associated bolster members an provide effective thrust resisting elements designed to supplement the lugs 16 and sockets 18 in the distribution of stresses set up in excess of those imposed upon the lugs. The disposition of lugs 16 and sockets 18 between respective bolt openings 28 and 25 insures direct transmission of forces from lugs to bolts in either direction of train movement to prevent relative displacement of center and transverse bolster members.

The invention is of especial value when associated with locking center pins 31 to prevent accidental displacement of car truck or body resulting from derailment or collision. The particular embodiment of the locking pin shown is covered in Patent #1,402,972, issued January 10, 1922, to Milton E. Shaver, but any approved design of locking pin may be substituted for that indicated, provided only that it be of sufficient proportions to prevent relative horizontal or vertical separation of car body 32 and truck bolster spider 14. With the spider securely locked to the car body and the spider lugs 16 engaging sockets 18 of the respective transverse bolsters 13, complete unity of action is afforded to avoid the telescoping of cars heretofore incident to collision because of the failure of the bolts or rivets securing the spider 14 to associated members of the truck. The combined resistance to relative horizontal displacement of truck and car body afforded by the locking center pin 31 and interengaging truck spider 14 and transverse bolsters 13, effectually prevents the over-riding of the platforms of adjacent cars since the trucks are held from movement inwardly from their normal positions even though spider and bolster connecting bolts 24 should fail under the extreme disruptive forces of impact.

What I claim is:

1. In a car truck, a pair of bolsters spaced apart and extending transversely of the truck, a connecting longitudinal bolster having interlocking engagement with said transverse bolsters and provided with depending lug portions, and open end socket portions integral with the transverse bolsters for receiving said lugs.

2. In a car truck, a pair of bolsters spaced apart and extending transversely of the truck, a connecting longitudinal bolster having interlocking engagement with said transverse bolsters and provided with extended depending lug portions, and elongated socket portions integral with the transverse bolsters for receiving said lugs.

3. In a car truck, a plurality of transverse bolster elements spaced apart and provided with core openings spaced longitudinally of the respective bolsters, a longitudinal bolster connecting said transverse bolsters having depending terminal lug portions, and socket openings terminating in the core openings of the transverse bolsters adapted to receive said lug portions.

4. In a car truck, a plurality of bolsters arranged transversely of the truck and provided with elongated socket portions terminating in core openings extending longitudinally of the respective bolsters, and a longitudinal bolster connecting said transverse bolsters having terminal lug portions adapted to engage said sockets.

5. In a car truck, a plurality of bolsters arranged transversely of the truck and respectively provided with elongated tapered socket portions terminating in core openings extending longitudinally of said bolsters, and a longitudinal bolster connecting said transverse bolsters having terminal lug portions adapted to engage said sockets.

6. In a car truck, a pair of bolsters spaced apart and extending transversely of the truck, a connecting longitudinal bolster having interlocking engagement with said transverse bolsters and provided with extended depending lug portions, and open-end socket portions integral with the transverse bolsters for receiving said lugs.

7. In a car truck, a plurality of bolsters arranged transversely of the truck and respectively provided with elongated tapered socket portions having open ends, and a longitudinal bolster connecting said transverse bolsters having terminal lug portions adapted to engage said sockets.

8. In a car truck, a plurality of bolsters arranged transversely of the truck and respectively provided with elongated open-end socket portions terminating in core openings extending longitudinally of said bolsters, a longitudinal bolster connecting said transverse bolsters having terminal lug portions adapted to engage said sockets, and removable connecting devices disposed on opposite sides of said lugs and sockets.

In witness whereof I have hereto set my hand this 26th day of November, 1927.

WILLIAM H. MUSSEY.